May 27, 1941.  C. A. CAMPBELL  2,243,245
AIR BRAKE
Filed May 13, 1940  3 Sheets-Sheet 1
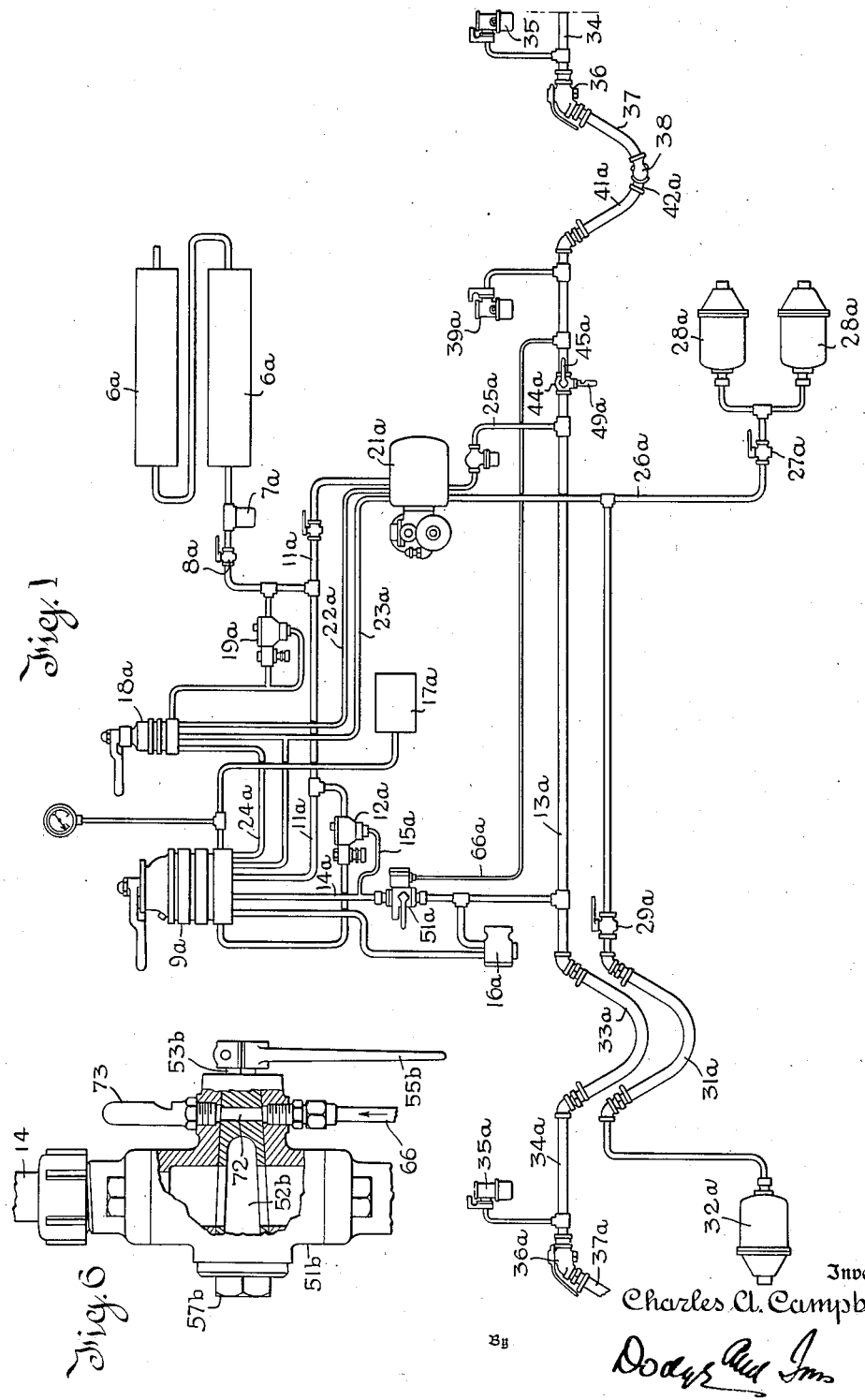
Inventor
Charles A. Campbell
By
Dodge and Sons
Attorneys May 27, 1941.　　　C. A. CAMPBELL　　　2,243,245
AIR BRAKE
Filed May 13, 1940　　　3 Sheets-Sheet 2
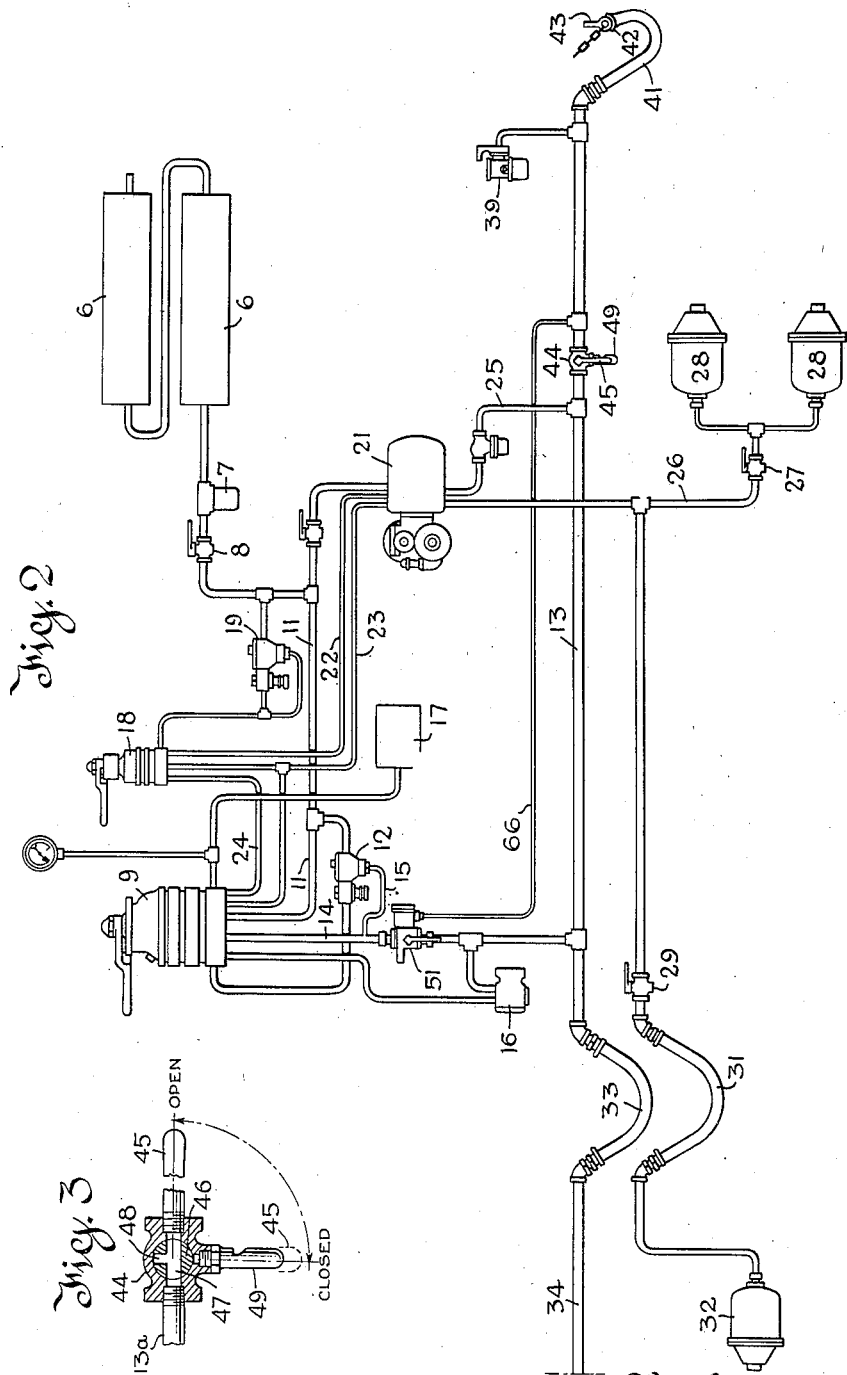
Inventor
Charles A. Campbell
By
Attorneys May 27, 1941.  C. A. CAMPBELL  2,243,245
AIR BRAKE
Filed May 13, 1940   3 Sheets-Sheet 3
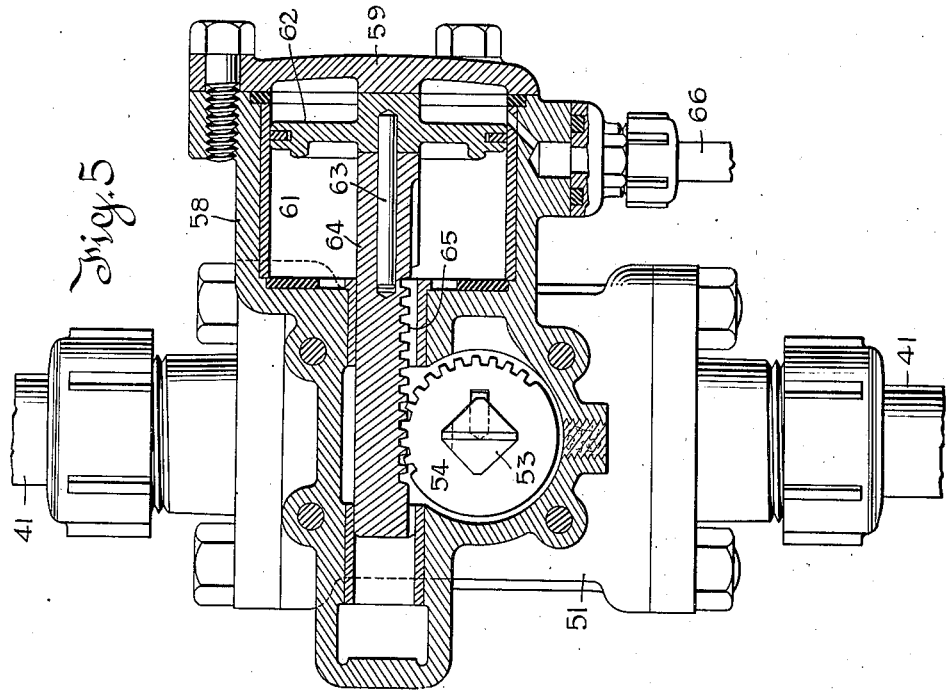
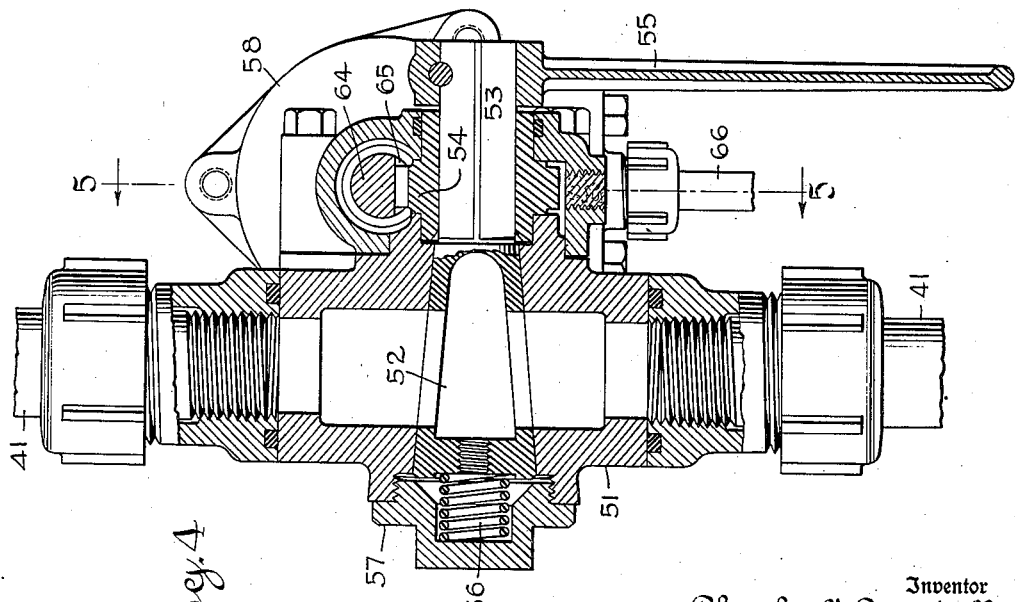
Inventor
Charles A. Campbell
By Dodge and Ims
Attorneys Patented May 27, 1941

2,243,245

UNITED STATES PATENT OFFICE 2,243,245

AIR BRAKE

Charles A. Campbell, Watertown, N. Y., assignor to The New York Air Brake Company, a corporation of New Jersey Application May 13, 1940, Serial No. 334,940

5 Claims. (Cl. 303—14)

This invention relates to air brakes, and particularly to double heading connections for automatic systems.

In double heading trains equipped with automatic brakes, control is exercised through the engineer's brake valve of the leading engine. On the second engine, the engineer's brake valve and independent brake valve are carried in running position, and the so-called "double heading cock" interposed between this engineer's brake valve and the brake pipe is closed. If more than two engines are connected, the brake systems of all engines except the leading engine are set with double heading cocks closed, as above described.

The basic purpose is to prevent the main reservoir and feed valve on the second and any succeeding engine from supplying air to the brake pipe, while the engineer in the leading engine is attempting to reduce brake pipe pressure to cause an application. Serious accidents have been caused by open double heading cocks on the second or succeeding engines of a multiple headed train, for they deprive the engineer of the leading engine of control of the brakes.

The present invention provides a positive safeguard against the occurrence of such accidents.

According to the invention, an improved double heading cock is provided, having in addition to the handle by which it is manually set, a motor which when energized closes the double heading cock and holds it closed. The motor is energized by air derived from the brake pipe at a point forward of the forward brake pipe stop cock. Thus, the motor will always be vented on a leading engine, and under pressure on the second and succeeding engines of a multiple header.

In lieu of the motor, I may provide an air operated signal, preferably a whistle, which becomes effective if the double heading cock is open when the forward end of the brake pipe is under pressure.

To assure proper positioning of the forward brake pipe stop cock, this cock is provided with an auxiliary port leading to a signal such as a whistle. The valve is so contrived that when it is closed the whistle is connected to that part of the brake pipe forward of the stop cock. On a leading engine this part of the brake pipe is not under pressure, but on the following engine of a double header the leading engine charges this part of the pipe and the whistle blows until the stop cock is opened.

Hence, the invention offers protection against a closed stop cock at the head of a second or succeeding engine of a multiple header, as well as against an open double heading cock on such engine.

The invention can be applied to various locomotive equipments, and in the accompanying drawings, it will be illustrated as applied to two locomotives, each equipped with the well known 6-ET equipment.

In the drawings:

Figure 1 shows the essential locomotive and tender air brake equipment of the second locomotive of a double header, together with the rear end of the tender brake pipe of the leading locomotive.

Fig. 2 shows the remaining portion of similar engine and tender air brake equipment of the leading locomotive.

Figs. 1 and 2, assembled from left to right in the order stated, produce a complete diagram of two such locomotives connected for double heading.

Fig. 3 is a sectional view of the brake pipe stop cock for the forward end of each locomotive, the cock being shown in open position.

Fig. 4 is a vertical axial section through the plug cock of the double heading valve in open position.

Fig. 5 is a section on the line 5—5 of Fig. 4, also showing open position.

Fig. 6 is a section of a modified double heading cock with whistle port and whistle.

The components of the standard brake equipment will first be identified, the same numbers being used for similar components on the first or leading locomotive and on the second locomotive, those on the second locomotive being differentiated by the letter $a$.

The main reservoirs 6, charged by a compressor (not shown) deliver air through the main filter 7 and normally open stop cock 8 to the entire brake system. There is an engineer's brake valve 9, assumed to be of the H–6 type, which has a main reservoir air connection 11 and a feed valve connection through the feed valve 12. The brake pipe is shown at 13, and the branch pipe leading from the engineer's brake valve 9 to the brake pipe is indicated at 14. The double heading cock, hereafter identified and described, is as usual interposed in the pipe 14 between the engineer's brake valve 9 and the brake pipe 13. The connection 15 is simply a pressure transmitting connection to the pressure responsive element of the feed valve.

An ordinary emergency vent valve is indicated at 16. The equalizing reservoir is shown at 17. The independent brake valve appears at 18 and is supplied from the main reservoirs by a feed valve 19. The distributing valve appears at 21 and has a supply connection from the main reservoir air supply line 11.

The pipes 22 and 23 are, respectively, the release pipe and the application cylinder pipe. The connection 24, between the engineer's brake valve and the independent brake valve, is the well known U pipe. The brake pipe branch leading to the distributing valve is indicated at 25. There is a pipe 26 which leads through a normally open cut out cock 27 to the engine brake cylinders 28. A branch of pipe 26 leads through a normally open cock 29 and hose 31 to the tender brake cylinder 32. The rear end of the brake pipe 13 on the locomotive is connected by a hose 33 with the tender brake pipe 34, to which an emergency vent valve 35 is applied. There is an angle cock 36 at the rear end of the tender brake pipe, with a hose 37 provided with separable coupling 38.

The parts so far described are all standard.

Near the forward end of each locomotive there is an emergency vent valve 39, and at the extreme forward end of the brake pipe 13 is a connecting brake pipe hose 41 with separable coupling 42. It will be observed that in double heading the forward hose 41a of the second locomotive shown in Fig. 1, is connected to the brake pipe hose 37 at the rear of the forward tender. The forward brake pipe hose 41 of the leading locomotive is shown hung to a dummy coupling 43, this being common practice.

It is customary to use an angle cock or a stop cock between the hose 41 at the head of the locomotive and the brake pipe 13. Because the valve is not frequently operated, the common practice is to use a stop cock rather than an angle cock, but even so, the stop cock is placed between the branch leading to the vent valve 39 and the forward brake pipe hose 41, and usually is located close to the hose.

According to the present invention, I use a stop cock 44 and I prefer to locate it immediately forward of the branch 25 leading from the brake pipe to the distributing valve 21. The reason for so locating this cock is that it then cuts out the functionless forward portion of the brake pipe.

This cock 44 is preferably specially constructed, as shown in Fig. 3. The handle 45 is provided with stops, as usual, so that it can swing 90° from a horizontal valve open position, shown in Figs. 1 and 3, to a vertical valve closed position, shown in Fig. 2.

Referring to Fig. 3, in which the numeral 44 is applied to the body of the cock, it will be observed that the cock plug 46 has a through port 47 and a lateral branch port 48. In the body 44 is a side port leading to a whistle 49. In the open position of the cock (Figs. 1 and 3), the brake pipe 13a is open to the hose connection 41a and the side port is blanked, but in the closed position of the cock (Fig. 2), the brake pipe 13 is disconnected from the forward hose connection 41. In the closed position, that portion of the brake pipe forward of the cock 44 is connected with the whistle 49.

If the cock 44a is closed on the second locomotive of a double header, air supplied from the brake pipe of the leading locomotive will blow the whistle continuously.

The double heading cock is indicated in Figs. 1 and 2 by the numeral 51 applied to its body. The construction of this double heading cock can be understood better by reference to Figs. 4 and 5. Mounted in the body 51 of the cock is an ordinary cone plug 52 with squared stem 53. On this stem are mounted a sector gear 54 and a manual operating handle 55. The plug is held to its seat by a coiled compression spring 56 mounted beneath a removable cap 57. Bolted to the body 51 is a motor housing 58. This has a removable cap 59 which closes the outer end of a cylinder 61. In this cylinder works a piston 62. This piston has extending axially from it a guide stem 63 which enters a bore in the end of a piston rod 64. The piston rod 64 is guided to move longitudinally and has rack teeth 65 which engage the teeth on the sector gear 54.

The space on the outer side of the piston 62 is connected by a protection pipe 66 with that portion of the brake pipe 13 forward of the valve 44. Thus, with the piston 62 in its retracted position, as shown, the plug 52 may be rotated between open and closed position, without entailing motion of the piston 62. However, if the protection pipe 66 is under pressure, the piston 62 will be forced to the left (as viewed in Fig. 5) and will rotate the plug 52 90° to closed position, if the cock be open at the time. If the cock is closed, the piston merely moves to the left, idly taking up the lost motion between the piston and the stem 64.

*Modified construction*

In Fig. 6, a modified double heading cock is illustrated. This has a body 51b a plug 52b, a squared stem 53b, and a handle 55b. The plug is held seated by a spring similar to the spring 56 of Fig. 4, which does not appear in the drawings but which is confined by the cap 57b. The plug is somewhat elongated and in addition to the main port controlling the pipe 14, there is a secondary or auxiliary port 72, which is open when the main port in the cock is open and closed when the main port in the cock is closed. The port 72 controls flow to the whistle 73 from the connection 66.

The difference between the embodiments of Figs. 4 and 5, on the one hand, and Fig. 6, on the other, is merely that the first construction includes means for automatically closing the double heading cock; whereas the structure of Fig. 6 merely gives an audible signal if the cock is open when it should be closed. Both are conditioned for operation by movement of the cock to open position, and both are rendered operative by the supply of air through the protection pipe 66.

*Operation*

If two engines are connected for double heading, the forward engine establishes brake pipe pressure. On the forward engine, cock 44 at the forward end of the brake pipe must be closed before the engineer can develop any brake pipe pressure. Consequently, there is no danger that the engineer will fail to see that this cock is closed, for he cannot release the brakes until it is closed.

When the leading engine is connected to a succeeding engine, the cock 44a at the head of the second engine should be open, and after the locomotives have been properly connected, the whistle 49a will blow continuously until the cock is opened.

Assuming the engine is equipped with a motor operated double heading cock, such as shown in Figs. 4 and 5, the cock on the second locomotive will be moved to open position as soon as the locomotives are properly connected, and irrespective of the position of the valve 44a. If a double heading cock of the type shown in Fig. 6 is used on the second locomotive, then the whistle 73 will sound as soon as the locomotives are coupled and until the double heading cock is moved to closed position. Thus, the invention in one form provides for automatic closure of the double heading cock on the second locomotive, as a necessary incident, to coupling of the second locomotive with the forward locomotive. The form shown in Fig. 6 does not give automatic closure, but does give an unmistakable signal if the double heading cock on the second locomotive is left open when it should be closed.

The two schemes are approximate equivalents and involve the same broad inventive concept.

In the claims I shall use the term "fluid pressure operated protective means associated with the double heading cock" as an inclusive term broad enough to cover either the motor or the signal. Each is operated by fluid pressure and each is conditioned to operate by motion of the double heading cock to open position.

Observe that if the cock of Fig. 5 is closed, the motor piston 62 is impotent. Similarly, in the structure of Fig. 6, the whistle is rendered active by opening of the cock. Both schemes involve the same underlying idea of activating the fluid pressure operated protection means by the pressure developed ahead of the cock 44a on the second locomotive of a double header.

Two embodiments of the invention have been illustrated for purposes of explanation, and modifications will suggest themselves. The detailed description given is illustrative and implies no limitation to the specific construction, the scope of the invention being defined in the claims.

What is claimed is:

1. In an automatic air brake system, locomotive brake equipment comprising in combination a brake pipe extending from end to end of the locomotive and provided at its ends with means for connection with other brake pipe units; a stop cock near but spaced from the extreme forward end of said brake pipe; an engineer's brake valve connected by a branch with said brake pipe at a point to the rear of the stop cock; a double heading cock controlling said branch; fluid pressure operated protective means associated with said double heading cock and conditioned to operate by movement of the double heading cock to open position; manually operable means affording the sole means for setting said double heading cock in open position; and a connection leading from the brake pipe at a point forward of the stop cock to said protective means.

2. In an automatic air brake system, locomotive brake equipment comprising in combination a brake pipe extending from end to end of the locomotive and provided at its ends with means for connection with other brake pipe units; a stop cock near but spaced from the extreme forward end of said brake pipe; an engineer's brake valve connected by a branch with said brake pipe at a point to the rear of the stop cock; a double heading cock controlling said branch; a fluid pressure operated motor serving when subjected to fluid pressure to move said double heading cock to closed position, said motor being incapable of moving said cock to open position; manual means for actuating said double heading cock; and a pressure transmitting connection from the brake pipe, at a point forward of said stop cock, to said motor.

3. The combination defined in claim 1 in which the stop cock includes an audible air operated signal, which is connected by the cock with that portion of the brake pipe forward of the cock, when the cock is closed.

4. The combination defined in claim 2 in which the stop cock includes an audible air operated signal, which is connected by the cock with that portion of the brake pipe forward of the cock, when the cock is closed.

5. In an automatic air brake system, locomotive brake equipment comprising in combination, a brake pipe extending from end to end of the locomotive and provided at its ends with means for connection with other brake pipe units; an engineer's brake valve connected with said brake pipe by a branch; and two stop cocks, each including an auxiliary port and associated air operated audible signal, one of said cocks being interposed in said branch to control the same, and serving to open its auxiliary port when the branch is open, and the second cock being interposed in said brake pipe forward of said branch and to the rear of the forward end of the brake pipe, said second cock serving to open its auxiliary port when it closes the brake pipe; and supply connections to both said auxiliary ports from a point in the brake pipe forward of said second cock.

CHARLES A. CAMPBELL.